United States Patent
Fellows et al.

(10) Patent No.: US 9,641,431 B1
(45) Date of Patent: May 2, 2017

(54) SYSTEM AND METHODS FOR UTILIZATION-BASED BALANCING OF TRAFFIC TO AN INFORMATION RETRIEVAL SYSTEM

(75) Inventors: Sean Joseph Fellows, Mountain View, CA (US); Nathan Grenville Parker, San Jose, CA (US)

(73) Assignee: Google Inc., Mountain View, CA (US)

( * ) Notice: Subject to any disclaimer, the term of this patent is extended or adjusted under 35 U.S.C. 154(b) by 841 days.

(21) Appl. No.: 13/450,105

(22) Filed: Apr. 18, 2012

(51) Int. Cl.
*G06F 15/173* (2006.01)
*H04L 12/715* (2013.01)
*H04L 29/08* (2006.01)

(52) U.S. Cl.
CPC .......... *H04L 45/46* (2013.01); *H04L 67/1095* (2013.01)

(58) Field of Classification Search
CPC . H04L 45/46; H04L 67/1002; H04L 67/1008; H04L 67/1012; H04L 67/1095
USPC .................................................. 709/223–226
See application file for complete search history.

(56) References Cited

U.S. PATENT DOCUMENTS

| | | | | |
|---|---|---|---|---|
| 6,303,297 | B1* | 10/2001 | Lincoln et al. ............... | 435/6.12 |
| 6,988,139 | B1* | 1/2006 | Jervis ..................... | G06F 9/5038 709/224 |
| 8,352,608 | B1* | 1/2013 | Keagy ....................... | G06F 8/63 709/220 |
| 8,547,840 | B1* | 10/2013 | Kumar ................. | H04L 43/0894 370/231 |
| 2004/0193827 | A1* | 9/2004 | Mogi .................... | G06F 9/5083 711/170 |
| 2007/0094343 | A1* | 4/2007 | Sangle ................ | H04L 67/1095 709/207 |
| 2008/0040630 | A1* | 2/2008 | Travostino .......... | H04L 12/5695 714/11 |
| 2008/0222154 | A1* | 9/2008 | Harrington ....... | G06F 17/30206 707/999.01 |
| 2008/0229318 | A1* | 9/2008 | Franke .......................... | 718/104 |
| 2009/0006382 | A1* | 1/2009 | Tunkelang et al. ............... | 707/5 |
| 2009/0119285 | A1* | 5/2009 | Sundaresan et al. ............ | 707/5 |
| 2010/0250642 | A1* | 9/2010 | Yellin et al. ................... | 709/201 |
| 2010/0332511 | A1* | 12/2010 | Stockton et al. ............. | 707/759 |
| 2011/0205586 | A1* | 8/2011 | Takahashi et al. .......... | 358/1.15 |
| 2011/0307903 | A1* | 12/2011 | Vaddagiri ..................... | 718/105 |
| 2013/0147816 | A1* | 6/2013 | Hartog .................... | G06F 9/505 345/503 |
| 2013/0179895 | A1* | 7/2013 | Calder .................. | G06F 9/5077 718/104 |

* cited by examiner

*Primary Examiner* — Minh-Chau Nguyen
(74) *Attorney, Agent, or Firm* — Honigman Miller Schwartz and Cohn LLP

(57) ABSTRACT

Systems and methods for, among other things, a utilization based load balancing system which controls the distribution of queries to an information retrieval system made up of a network of server clusters. In one embodiment, a server cluster allocates computational resources among computational tasks. These computational tasks are replicated across a given server cluster, typically such that those computational tasks requested more frequently have more replicas, and more resources allocated to them to fulfill the requests. The system applies a utilization metric to determine how much capacity a given task has available and uses this determination to determine the capacity available for the cluster as a whole. Load balancing is achieved by re-directing queries to another cluster in response to the utilization value for a given cluster reaching a threshold.

20 Claims, 6 Drawing Sheets

SYSTEM AND METHODS FOR UTILIZATION-BASED BALANCING OF TRAFFIC TO AN INFORMATION RETRIEVAL SYSTEM

FIELD OF THE INVENTION

The systems and methods described herein relate to a load balancer, and particularly, to systems that provide efficient distribution of queries to network hardware such that clusters of hardware are kept within a designated operational range.

BACKGROUND

A load balancing system, or load balancer, is a protocol, implemented on a piece of network hardware, such as a network switch, and adapted to direct network traffic to different clusters of hardware so as to distribute the workload such that no hardware is overloaded with tasks, thereby preventing hardware failure due to prolonged over-working.

A load balancing system may be implemented in an information retrieval system, such as a search engine, whereby the network hardware serves to reply to search queries. In such cases, the load balancing metric may be based on queries per second (QPS), such that a static limit to the number of acceptable QPS is set, using empirical data. Then, when the QPS limit is reached for a given cluster, traffic is diverted to another. The problem with this method is that it does not take account of how expensive a given query is. For example, a given query to the system may yield a certain number of results, but the number of results may increase dramatically over time, and the processing work required to respond with all appropriate results will also increase. The QPS limit is no longer useful, since the work done by the hardware to fulfill that same number of queries has increased to an unacceptably high level.

An alternative to QPS-based load balancing is to use a cost-based method, where the metric of interest is the number of items processed by a given CPU in a cluster. It is assumed that this number of items processed is equivalent to the work being done by a given processor, and while this has been shown to increase the stability of the load balancing beyond the QPS-based methodology, the correlation between the number of items processed by a CPU, and the work done by the CPU is not always predictable. This de-correlation essentially means that a given process may change and use more of the CPU capacity, or vice versa, such that the capacity is unpredictable.

A further alternative load balancing method is to use actual CPU usage as the metric upon which the balancer runs. While this method increases the precision of the load balancer beyond that of the two methods previously described, it has been found to induce issues of unpredictability. If a given process within the information retrieval system is subsequently optimized to use less CPU capacity, this means that the capacity of the cluster increases. In response to this increase in capacity, the number of queries directed to the cluster increases, and this has been shown to result in another part of the cluster being overloaded. Essentially this means that each time an aspect of the system is optimized, load balancing using CPU usage as a metric has to be recalibrated.

As such, there is a need for a more efficient method of balancing the work load to clusters of network hardware.

SUMMARY OF THE INVENTION

The systems and methods described herein include, among other things, a utilization based load balancing system, which controls the distribution of queries to an information retrieval system made up of a network of server clusters. A query can be considered a request, by a client computer, for information from a server. In this embodiment, a server cluster allocates its computational resources among computational tasks. These computational tasks are replicated across a given server cluster, typically such that those computational tasks requested more frequently have more replicas, and hence, more resources allocated to them to fulfill the requests. The utilization based balancing system, or UBB system, applies a utilization metric to determine how much capacity a given task has available, calculated by a utilization processor, and collectively, the capacity available for the cluster as a whole, calculated by a UBB processor. Load balancing is achieved by re-directing queries, using a re-allocation processor, to another cluster in response to the utilization value for a given cluster reaching a user-defined threshold.

In certain embodiments, the utilization value of a task of a server cluster is calculated using a utilization processor, where the utilization value is a fraction expressing the current demand on a system resource versus the threshold demand for that system resource, where demand can be interpreted as a description of how often the system resource is requested for use. Optionally, a utilization value may be determined as a function of current CPU speed and maximum acceptable CPU speed, or as a function of current memory usage and acceptable memory usage, or a function of the current number of queries per second and the maximum acceptable queries per second, or on other factors or combination of such factors. Those of skill in the art will recognize that other measures of system resources, such as network bandwidth, data storage capacity, power requirements, and other measures of a system resource may be used with the systems methods described herein without departing from the scope hereof. As such, utilization values may be compared with one another without knowledge of the underlying metrics, or associated units, used for their calculation.

In another embodiment, a UBB system considers a single utilization value for each server cluster, and this utilization value is the maximum of all local utilization values of the independent tasks within the cluster. This methodology is considered conservative, since it considers the most poorly-performing task, rather than the average utilization, thereby helping to prevent overloading of any part of the server cluster by incoming queries.

The utilization value threshold of a server cluster may be, in certain embodiments, set to be substantially 100% utilization of any task carried out in the respective server cluster, wherein the utilization value threshold is that utilization value above which the UBB system redirects queries to another server cluster.

The utilization value may be a dimensionless fraction, allowing the UBB system to compare utilization values regardless of the underlying hardware and metrics used to establish the utilization value, and thereby allowing the utilization based balancing methodology to be implemented on a wide variety of hardware.

Feedback may be employed between a utilization processor and UBB processor to ensure that the target utilization value is maintained, and that the threshold utilization value is not exceeded.

The target utilization value, maintained by the feedback loop, may optionally be one hundred percent.

The UBB system may be used as a mechanism to isolate faulty hardware. A utilization processor can be employed to continuously report a high (greater than 100%) utilization value, if it is detected that an associated server is generating errors. While the server may still have the capacity to accommodate network queries, the default high utilization value will reduce the traffic directed to the server until it reaches zero, thereby isolating the defective hardware.

In another aspect, a method of balancing queries to an information retrieval system is presented, wherein the information retrieval systems is made up of one or more server clusters, and the methodology involves dividing up the computational resources available to a server cluster among a set of computational tasks, calculating a utilization value for the set of tasks, and for the server cluster as a whole, and re-distributing queries when demand on the in-use server cluster increases above a utilization value threshold, or the computational resources available to the server cluster decrease without a change in demand.

In another embodiment, the method may involve the calculation of a utilization value as a function of CPU speed, wherein the current CPU speed is compared to a threshold CPU speed.

The load balancing method may also use memory usage as a metric for calculation of utilization values, whereby the current memory usage is compared to a threshold acceptable memory usage value.

In another embodiment, the method may calculate utilization values using queries per second as the metric, and the current number of queries per second is compared to a threshold queries per second value.

The method may calculate a single utilization value for a server cluster, with this value set equal to the maximum utilization value of all tasks running in the server cluster.

The load balancing method may also re-direct queries away from a server cluster when the single utilization value for the server cluster as a whole increases above a threshold, which is set to be one hundred percent.

The method, in another embodiment, calculates a utilization value to be a dimensionless number, which allows utilization values to be compared to one another without knowledge of the underlying metrics used.

The method may use feedback to hold the single utilization value of a server cluster at a desired value.

The feedback loop may hold the desired utilization value of the server cluster at a value of one hundred percent.

The load balancing method, in another embodiment, may also be used to report a default high utilization value when a server cluster is generating errors. This is a safety mechanism that will decrease the number of queries sent to the server cluster until reliable performance is restored.

In another aspect, a utilization based balancing method for an information retrieval system comprised of one or more server clusters involves dividing the computational resources of a server cluster among a number of computational jobs, calculating a utilization value for the computational jobs by comparing a real-time metric of computational resources being used by a job, to the threshold of acceptable resource use. Furthermore, the server cluster as a whole is given a single utilization value equal to the maximum of all job utilization values in the server cluster, and this server cluster utilization value is used to re-direct queries away from the server when this utilization value increases above a threshold.

BRIEF DESCRIPTION OF THE DRAWINGS

The systems and methods described herein are set forth in the appended claims. However, for purpose of explanation, several embodiments are set forth in the following figures.

DETAILED DESCRIPTION

In the following description, numerous details are set forth for purpose of explanation. However, one of ordinary skill in the art will realize that the embodiments described herein may be practiced without the use of these specific details. In other instances, well-known structures and devices are shown in block diagram form to not obscure the description with unnecessary detail.

The systems and methods described herein include, among other things, a utilization based load balancing system, henceforth the UBB system, which controls the distribution of queries to an information retrieval system made up of a network of server clusters. An information retrieval system may be a search engine, or another type of database with facilities for extracting targeted data. A query to an information retrieval system can be considered a set of instructions as to what information is requested, and by whom it is requested. These instructions can alternatively be described as simple computational tasks, such as arithmetic operations, with multiple tasks combining to fulfill a given query.

In this embodiment, a server cluster allocates its computational resources among computational tasks. A cluster's computational resources, or system resources, can be described as the total processing power (total number of calculations that can be performed by the cluster, sometimes referred to as the CPU clock speed), total working-space memory (random access memory), or any other limited and measurable resource employed for carrying out a computational task. Computational tasks are calculations that require an allocation of computational resources, and may be replicated across a given server cluster, typically such that those computational tasks requested more frequently have more replicas (copies), hence more resources allocated to them to fulfill the requests. The UBB system uses a utilization metric to determine how much capacity a given task has available, calculated by a utilization processor, and collectively, the capacity available for the cluster as a whole, calculated by a UBB processor. Load balancing is achieved by re-directing queries, using a re-allocation processor, to another cluster in response to the utilization value for a given cluster reaching a user-defined threshold, wherein the utilization value for a cluster may be the maximum of all local utilization values of the independent tasks carried out by a cluster.

Figure 1:
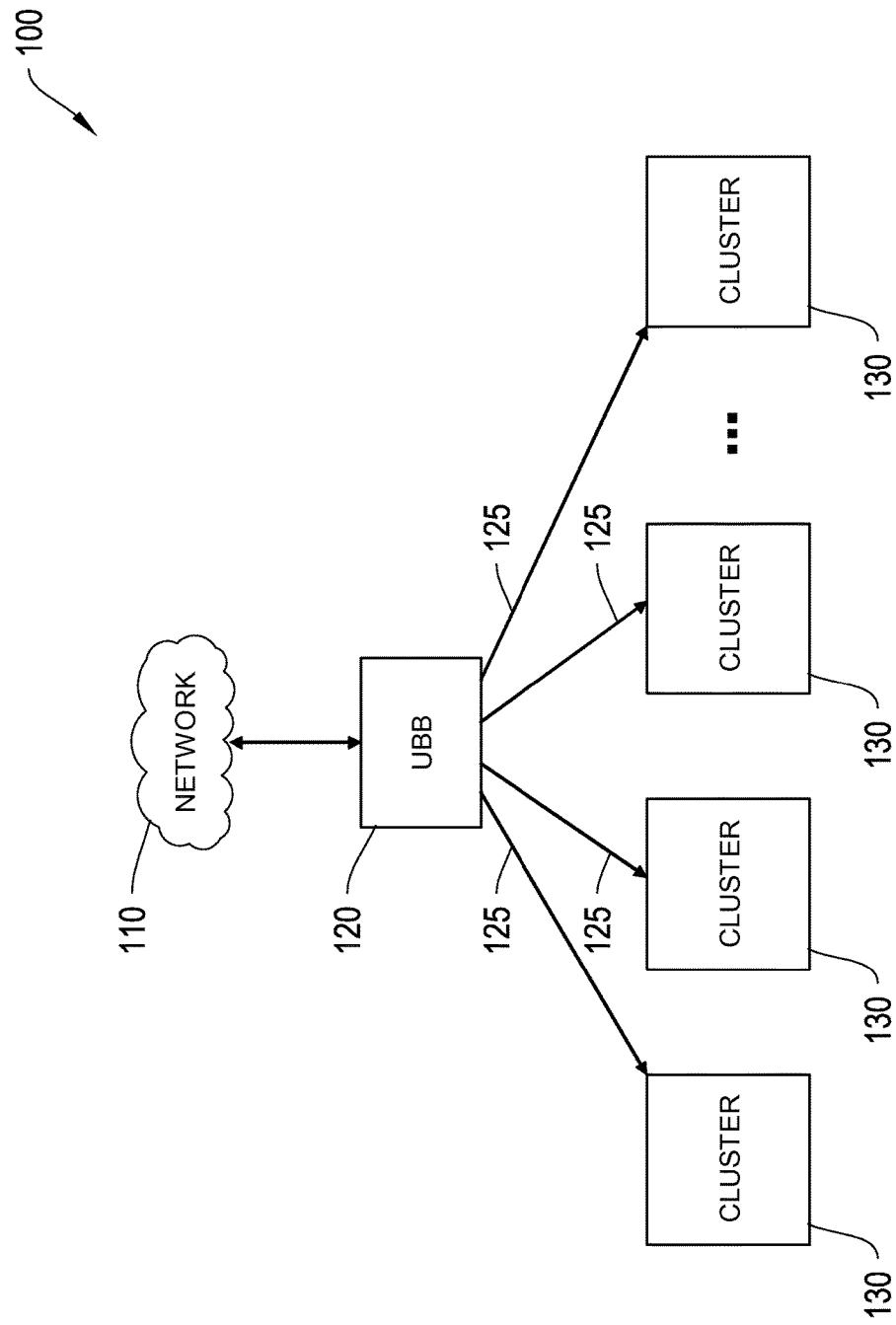
FIG. 1 is a schematic block diagram of an exemplary information retrieval system in which some embodiments operate.

FIG. 1 is a schematic block diagram of an information retrieval system environment 100. The system 100 comprises a connection system 110, a UBB system 120, a plurality of network connections 125, and one or more server clusters 130, with four server clusters 130 shown in the figure to represent a larger network. The connection system 110 may comprise a network, such as a Local Area Network (LAN), Wide Area Network (WAN), metropolitan area network (MAN), the Internet, or any other type of network or communication system between computer systems.

The connection system 110 links to the UBB system 120 to send and receive queries and responses between the network of server clusters 130. The UBB system 120 directs incoming queries from the connection system 110 to a given server cluster 130 so as to balance the workload experienced by the different server clusters 130. The UBB system 120 is made up of network hardware, such that queries to the server clusters 130 are sent over the network connection 125, which may be wired or wireless, using the open system interconnection (OSI) model layer 2 or layer 3, and where the network technology may include, for example, Ethernet, Fiber Channel, Asynchronous Transfer Mode (ATM), ITU-T, G.hn, and 802.11 or any suitable network technology.

A server cluster 130 can be considered a grouping of one or more computer servers, with a computer server being essentially a computer system adapted to fulfill the requirements of the information retrieval system 100. A server cluster 130 may interact with the UBB system 120 to prevent or reduce hardware over-loading, and subsequent temporary or permanent failure. The depicted system 100 may operate as part of a data center, a storage network, or with any system that has multiple servers for servicing similar tasks. A cluster can be a collection of identical servers, or the servers may differ from cluster to cluster. The UBB system 120 described herein may be employed with either architectures.

Figure 2:
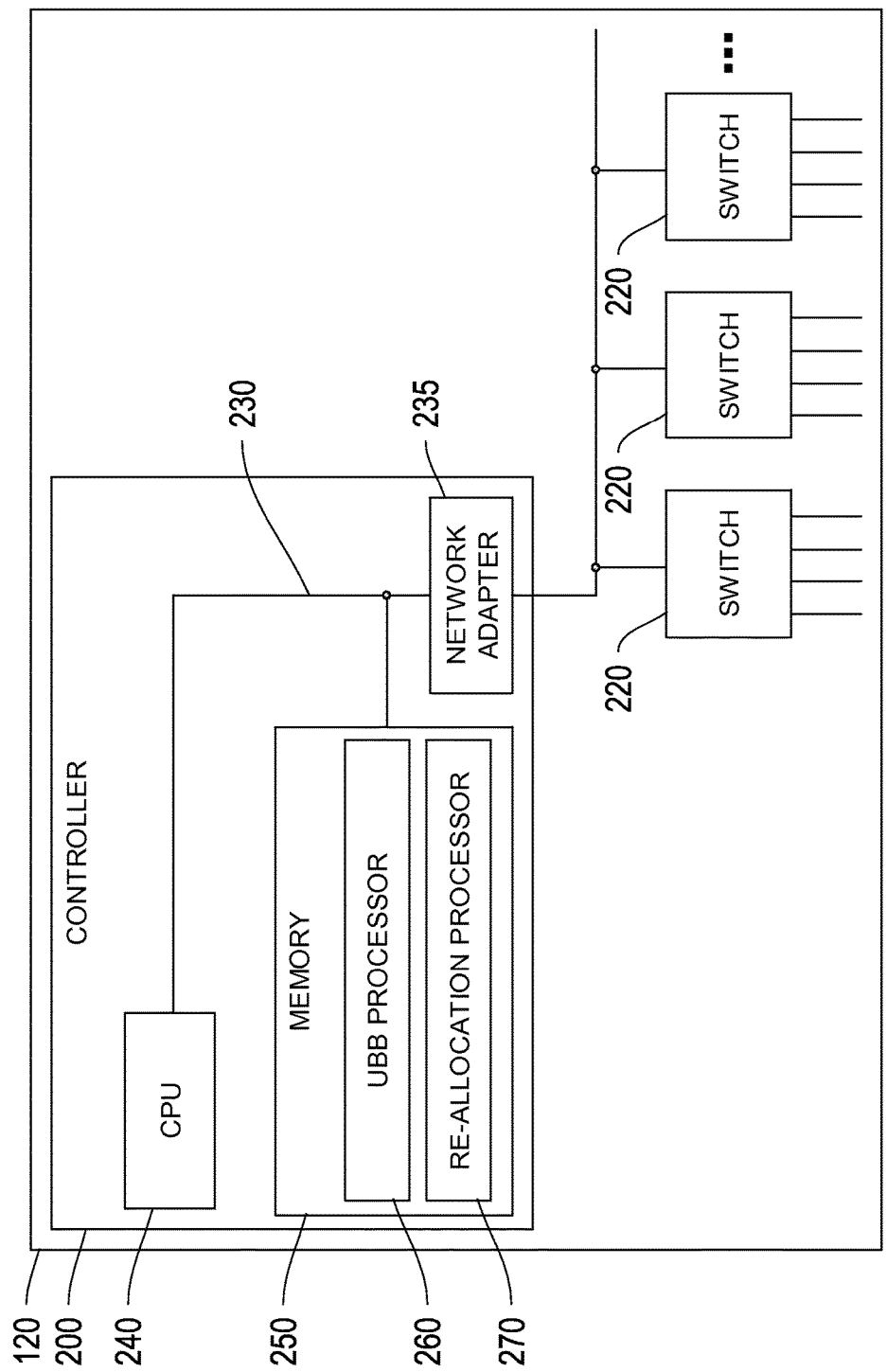
FIG. 2 is a schematic block diagram of a UBB system, having network hardware for use in the information retrieval system of FIG. 1.

FIG. 2 is a schematic block diagram of the depicted UBB system 120 having network hardware, as described herein for use in the information retrieval system 100 of FIG. 1. More particularly, FIG. 2 describes a network controller server 200, three switches 220, a system bus 230, a network adapter 235, a CPU 240, a memory 250, a utilization based balancing processor, henceforth, UBB processor 260, and a re-allocation processor 270. The network controller server 200 is a computer system adapted for network control, having the memory 250, and one or more CPUs 240, connected to a network adapter 235 by the system bus 230. The depicted network adapter 235 is a conventional network adapter and has the mechanical, electrical and signaling circuitry to connect the network controller server 200 to the network switches 200. The memory 240 is a conventional data memory and has storage locations that are addressable by the processor 220 and adapters for storing software program code and data. The memory 250 may include a form of random access memory (RAM) that is generally cleared by a power cycle or other reboot operation (e.g., it is a "volatile" memory). In other embodiments, however, the memory 250 may be a non-volatile memory that does not require power to maintain information. The CPU 240 and network adapter 235 may, in turn, include processing elements and/or logic circuitry configured to execute the software code and manipulate the data stored in the memory 250.

In some, but not all embodiments, the systems and methods described herein may include a network topology that removes the control plane from each network switch 220 such that the network hardware is centrally controlled from a network controller server 200, while the data plane, which carries the queries directed to the server clusters 130, remains handled by individual switches 220. In these embodiments, the network controller server 200 constructs a flow table on each switch 220, such that this flow table governs what actions to take when a packet of information arrives into the UBB system 120 from the connection system 110.

The UBB processor 260 determines when a cluster server has reached a threshold of acceptable utilization. The UBB processor 260, upon determining that a server cluster 130 has reached a threshold utilization, requests re-direction of network traffic away from the server cluster. This network traffic adjustment is implemented by the re-allocation processor 270, and re-directs network traffic without knowledge of the underlying utilization-based methodology. The UBB processor 260 is installed in the memory 250, and monitors the utilization values reported by the server clusters 130. When the UBB processor 260 determines that a given server cluster 130 has reached its peak acceptable utilization, it instructs the re-allocation processor 270 to adjust the network traffic to reduce the workload of the given server cluster 130. Upon calculation of the appropriate network traffic redirections, the re-allocation processor 270 instructs the CPU 240 to reprogram the routing tables, flow tables or similar structures, for each switch 220 such that queries are re-directed in whole or in part, away from the server cluster 130 that has reached its peak utilization. This control paradigm is known as a software defined network, as recited by the OpenFlow network specification (OpenFlow.org), but those skilled in the art will understand that the features shown within the network controller server 200 could alternatively be implemented by each switch 220, to construct a UBB system 120 within a conventional network system.

Figure 3:
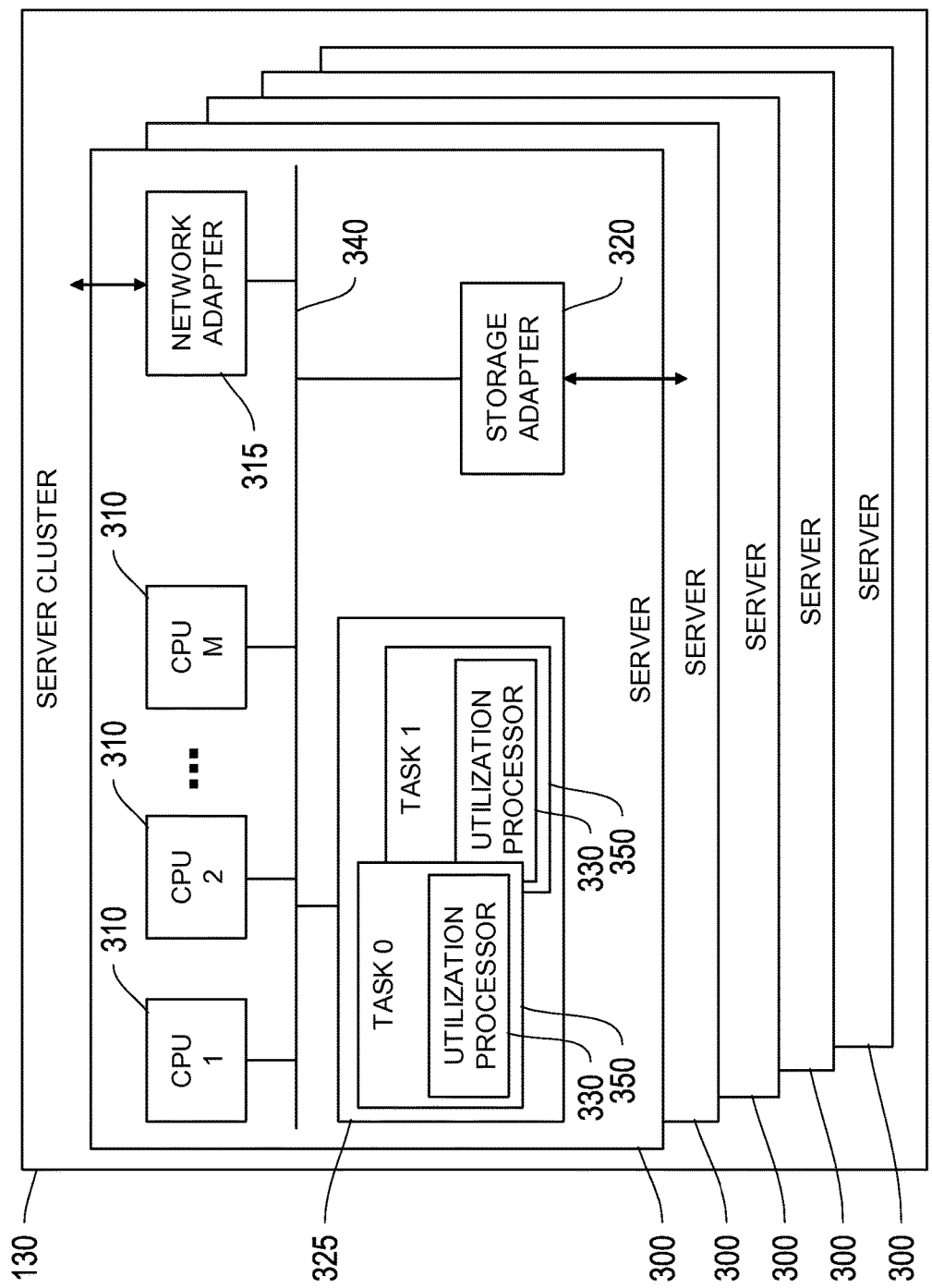
FIG. 3 shows a functional block diagram of the hardware of an exemplary server cluster.

FIG. 3 shows a functional block diagram of the hardware of an exemplary server cluster 130. More particularly, FIG. 3 shows five servers 300 (representing a server cluster 130 of five servers 300), with each server 300 containing a plurality of CPUs 310, similar to the CPU 240 in FIG. 2, a network adapter 315 much like the network adapter 235 of FIG. 2, a memory 325, two computational tasks 350, two utilization processors 330, a storage adapter 320, and a server system bus 340.

Those skilled in the art will understand that the server 300 embodiments described herein may apply to any type of special-purpose computer or general-purpose computer. To that end, a server 300 can be broadly, and alternatively, referred to as a computer system. Moreover, the teachings of the embodiments described herein can be adapted to a variety of server architectures including, but not limited to, a network-attached storage environment, or a storage area network and disk assembly directly-attached to a server computer. The term "server" should, therefore, be taken broadly to include such arrangements.

Generally, a server 300 in a server cluster 130 is a computer adapted to the computational requirements of the information retrieval system 100, and containing multiple CPUs 310 to process the incoming queries from the UBB system 120.

Communication between the server and the network connection 125 to the UBB system 120 is through a network adapter 315, which comprises the mechanical, electrical and signaling circuitry needed to connect server 300 and network connection 125. A network adapter 315 has a unique IP address to facilitate this connection. The memory 325 may, like the memory 250, comprise a form of random access memory (RAM) that is generally cleared by a power cycle or other reboot operation (e.g., it is a "volatile" memory). In other embodiments, however, the memory 325 may be a non-volatile memory that does not require power to maintain information. Communication between the CPUs 310, the memory 325, and the network adapter 315 is achieved using the server system bus 340, which may optionally connect to a storage adapter 320. The storage adapter 320 may be used to communicate with storage devices, which may, in turn, comprise disk devices that are arranged into a plurality of volumes, each having an associated file system for storing material required by the information retrieval system 100. The storage adapter 320 includes input/output (I/O) interface circuitry that couples to storage devices over an I/O interconnect arrangement, such as a conventional high-performance, Fiber Channel serial link topology. In response to a query from the UBB system 120, data may be retrieved by the storage adapter 320 and, if necessary, processed by the CPUs 310 (or the storage adapter 320 itself) prior to being forwarded over the server system bus 340 to the network adapter 315, where the data may be formatted into a packet and returned to the UBB system 120.

FIG. 3 depicts two tasks 350 within the memory 325. It is noted that a server 300 may optionally be assigned a single, multiple, or part of, a task 350. A utilization processor 330 is assigned to a task 350, and used to determine and report a utilization value to the UBB processor 260 within the UBB system 120. The utilization processor 330 determines a utilization value for a computational task carried out by the server 300, based on a measurable, and typically user-defined, limit to the resources available to the task. In one embodiment, the utilization value for a given task may be determined as a fraction of current resources being used versus an upper limit to the acceptable range of resource allocation:

$$\text{Utilization value} = \text{current resource being used}/\text{upper limit of user defined acceptable range of resource allocation}.$$

From the definition of utilization value above, it is noted that a resource may be defined as, among other things; CPU speed, memory usage, number of queries per second, network bandwidth, data storage capacity, or power requirements. It is also noted that the denominator of the utilization value may alternatively be referred to as the threshold demand acceptable for a resource. This threshold demand may also optionally be the target utilization value, meaning that it is desirable to increase the workload until it sustains a value at, but not beyond, the upper limit of the acceptable range of resource allocation. The utilization value is calculated as a dimensionless number, allowing the UBB processor 260 to compare utilization values generated using any appropriate metric, which may include, but are not limited to, a function of current CPU speed and maximum acceptable CPU speed, or a function of current memory usage and acceptable memory usage, or a function of the current number of queries per second and the maximum acceptable queries per second, or on other factors or combination of such factors.

The depicted utilization processor 330 and a UBB processor 260 employ a feedback loop to maintain a server cluster utilization at a target level, or utilization value threshold, wherein the feedback loop is a two-way communication link between the utilization processor 330 and UBB processor 260. This target level, or utilization value threshold, is nominally a 100% utilization value, implying that the UBB system 120 will try to maintain task utilization values at 100%, thereby maximizing the number of tasks handled by a cluster, without allowing the cluster to be overworked, wherein a 100% utilization value represents a maximum acceptable workload defined by the user of the UBB system 120. Continuous feedback between utilization processor 330 and UBB processor 260 prevents excessive oscillation of the utilization values about the utilization value threshold.

A utilization processor 330 can optionally be used to report a high utilization value if a server cluster is generating errors. This high utilization value will progressively decrease the number of queries directed to the server cluster to zero.

Figure 4:
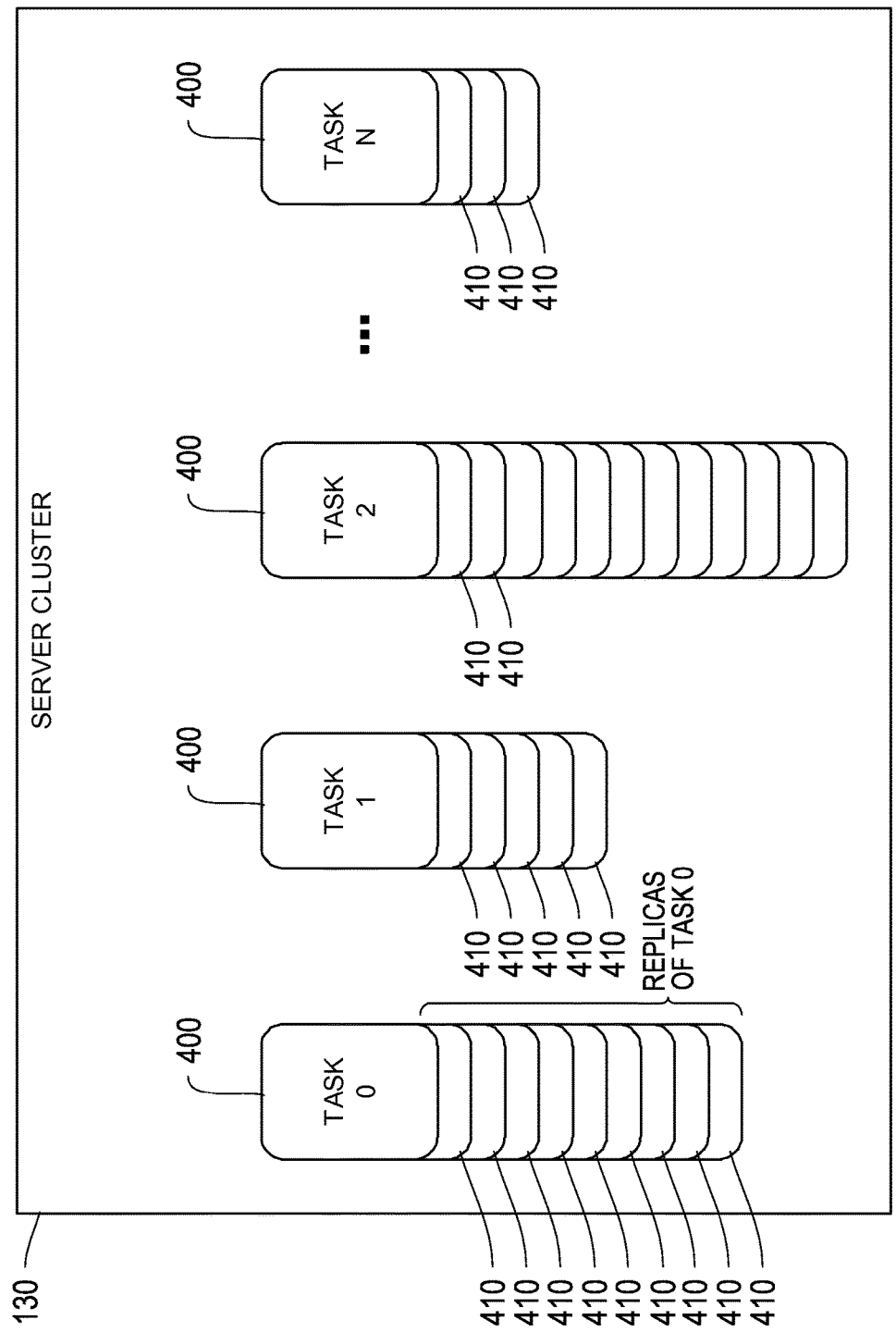
FIG. 4 depicts a pictorially representation of the server cluster of FIG. 3, with the hardware resources divided among tasks.

FIG. 4 depicts a pictorially representation of the server cluster of FIG. 3, with the hardware resources divided among tasks. More particularly, FIG. 4 depicts a server cluster 130, four tasks 400 (representative of a series of tasks 400), and a plurality of task replicas 410 (representative of a large number of replicas of tasks 400). The computational power, or processing resources, available to a server cluster 130 is provided by a plurality of processor cores, or CPUs 310, and this computational power is divided among the plurality of computational tasks 400. Several tasks 400 may combine to fulfill a given query to the information retrieval system, such that different queries may have a set of tasks in common. To accommodate greater demand for certain tasks 400 over others, task replicas 410 are created. The number of task replicas 410 of a given task 400 is typically set by a programmer, based on anticipated demand.

Figure 5:
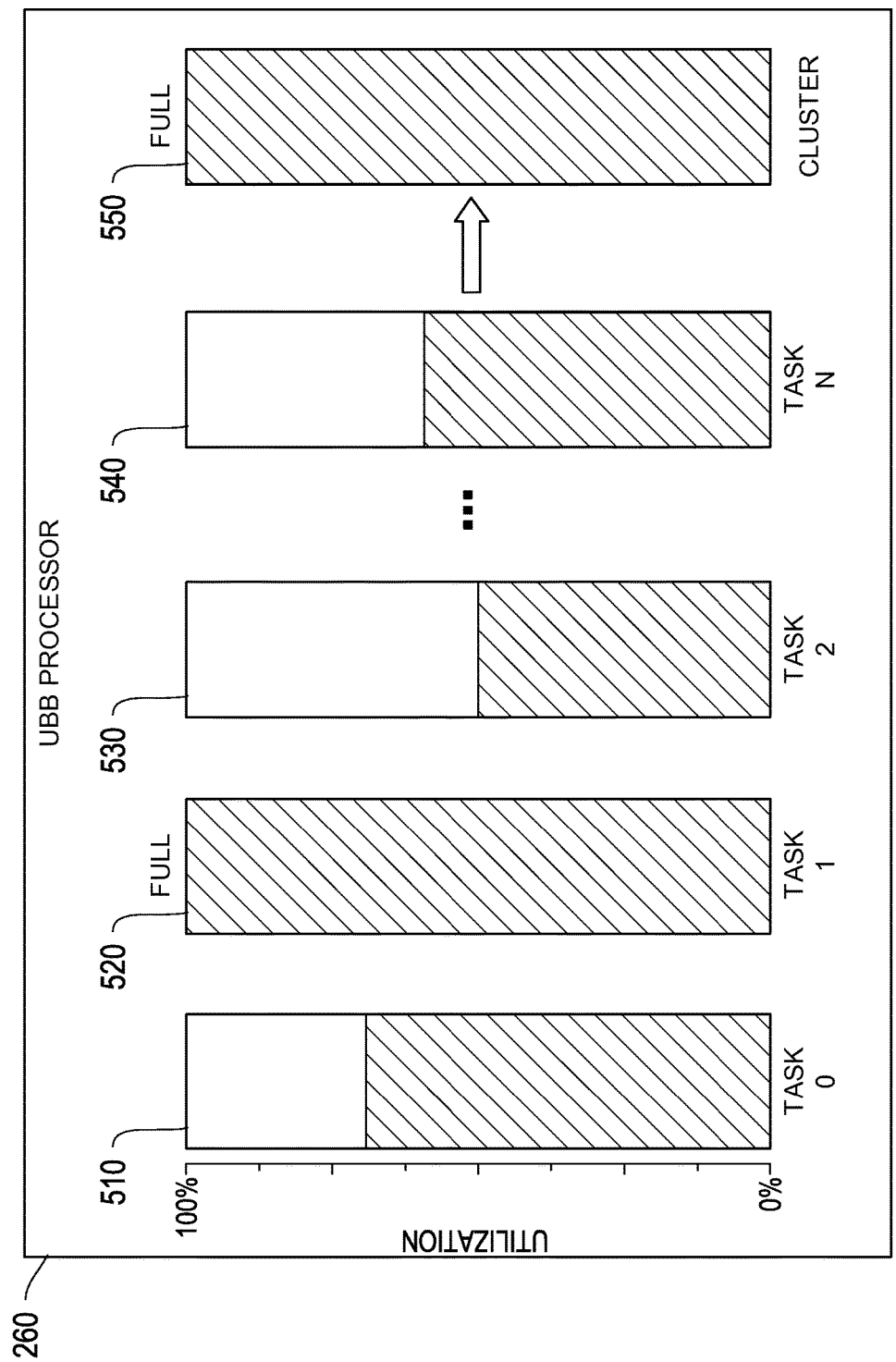
FIG. 5 depicts the assignment of a utilization value to a cluster, by a UBB processor.

FIG. 5 depicts the assignment of a utilization value to a cluster by a UBB processor 260. More particularly, FIG. 5 depicts five bar graphs, four of which (510, 520, 530, 540) represent the aggregate utilization values for four tasks 400 and their respective task replicas 410, and are henceforth known as task 0 graph 510, task 1 graph 520, task 2 graph 530, and task N graph 540. The UBB processor 260 typically monitors the utilization values calculated and reported by a utilization processor 330 on a server 300, and aggregates the utilization data such that a single utilization value for a task 400 and its task replicas 410 is calculated, and wherein this single utilization value may be represented as a graph, such as task 0 graph 510, task 1 graph 520, task 2 graph 530, and task N graph 540. The cluster graph 550 is a single utilization value representing the server cluster 130 as a whole. This single cluster utilization value is mapped by the UBB processor 260 as the highest of any aggregate task utilization value. In the exemplary monitoring process of FIG. 5, task 1 graph 520 has a utilization value of 100%, which is mapped to the single cluster utilization value, as shown. In this instance, the highest utilization value reported by a task is 100%, but it may optionally be a value less than, or greater than, 100%, and mapped as the single cluster utilization value of cluster graph 550. A utilization value of 100% indicates that a sub-group of computational tasks within a server cluster 130 has reached the upper limit of the acceptable range of resources assignable to those tasks. If the single cluster utilization value increases above 100%, the UBB processor 260 will adjust network traffic (queries to the information retrieval system) and instruct the re-allocation processor 270 to calculate alternative network traffic routes. The re-allocation processor 270 is subsequently used to reprogram the routing tables for each switch 220 such that queries are re-directed away from the server cluster 130 that has a utilization value beyond its threshold value. Mapping the maximum task utilization value to a server cluster 130 utilization value, as opposed to mapping the average task utilization value to a server cluster 130 utilization value, is considered a conservative load balancing protocol since it allows the re-allocation processor 270 to re-direct incoming queries as soon as any task within a server cluster 130 increases beyond an acceptable workload, and means that it is unlikely that any hardware will be subject to an unplanned workload.

Figure 6:
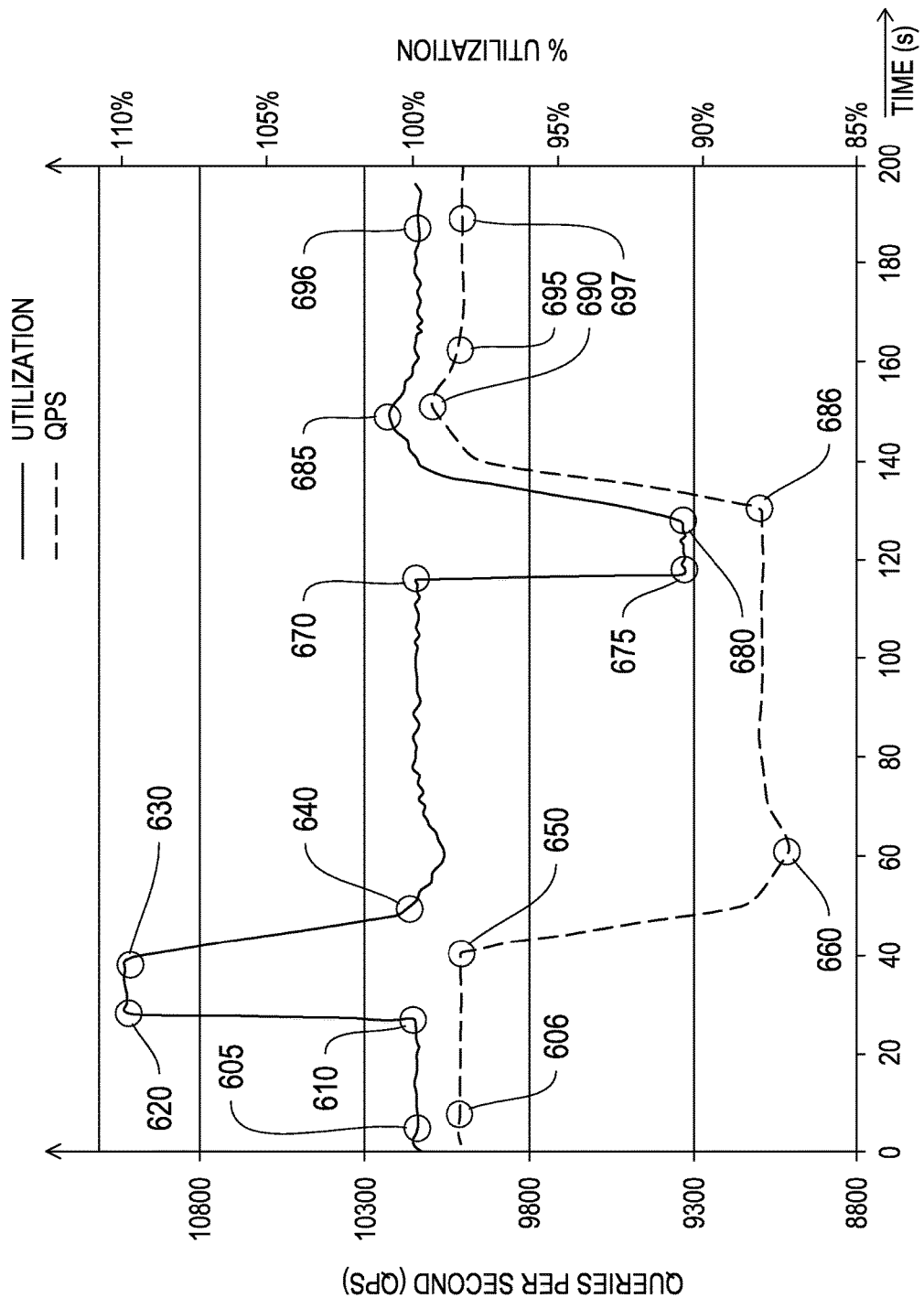
FIG. 6 depicts test data from a simulation of the UBB system.

FIG. 6 depicts testing data of the UBB system 120 subjected to an increase in utilization. The results are from a simulation run on the UBB system 120, and are presented as two graphs, a first queries-per-second (QPS) graph, and a second utilization graph. The x-axis depicts time in units of seconds, while a first y-axis depicts the number queries per second (QPS), and a second y-axis depicts percentage utilization. The results shown in FIG. 6 represent the simulation of a partial failure of a server cluster, such that the live servers in the cluster experience increased traffic. Alternatively, the test scenario may also represent a job that is "running hot", whereby a specific computational task is demanding more computational resources than expected. This scenario can be described as an increase the in the cost per query, since the same number of queries to the system demands more resources.

In particular, FIG. 6 depicts two graphs, a utilization graph, which represents a utilization value for a sever cluster, and a queries per second (henceforth QPS) graph, representing the requests directed to the server cluster. The utilization graph starts at point 605 at a value approximately equal to 100%. This corresponds to a QPS value of approximately 10000 at point 606. At point 610, the system (server cluster) experiences an increase in the cost per query, resulting in the utilization increasing to a value of 110% at point 620.

In response to this increase in utilization, the re-allocation processor 270 reduces the number of queries directed to the cluster, starting at point 650, and continuing until the QPS reaches a value of approximately 9000 at point 660, corresponding to a utilization value of approximately 100% at point 640. At point 670, the cost per query decreases, which may, for example, be due to servers coming back online after failure. Due to the decrease in cost per query, the utilization decreases to approximately 90% at point 675. Again, the UBB system responds to the change in utilization, and begins to increase the QPS directed to the server cluster at point 686. As a result of the increase in QPS, the cluster utilization again increases to approximately 100%, at point 685, and reaches steady-state at point 696, which corresponds to a QPS value of circa 10000 at point 697.

Some embodiments of the above described may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in. Additionally, the storage medium may be a hybrid system that stored data across different types of media, such as flash media and disc media. Optionally, the different media may be organized into a hybrid storage aggregate. In some embodiments different media types may be prioritized over other media types, such as the flash media may be prioritized to store data or supply data ahead of hard disk storage media or different workloads may be supported by different media types, optionally based on characteristics of the respective workloads. Additionally, the system may be organized into modules and supported on blades configured to carry out the storage operations described herein.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We claim:

1. A load balancing system for handling queries to an information retrieval system, the load balancing system comprising:
    a plurality of server machine clusters configured to handle tasks, the tasks replicated across the plurality of server machine clusters and performed by resources of the server machine clusters in order to retrieve information requested by a user, a number of task replicas for each corresponding task being based on an anticipated demand for the corresponding task;
    a utilization processing device configured to:
        track a utilization of the resources of the server machine clusters by each task and the corresponding task replicas; and
        determine task utilization values for each given task and one or more task replicas corresponding to each given task, each task utilization value being a function of a current demand made by the given task or one of the task replicas on a corresponding resource of a server machine cluster versus a threshold demand acceptable for the corresponding resource of the server machine cluster;
    a utilization-based balancing processing device configured to receive task utilization values and determine a cluster utilization value of each server machine cluster by:
        aggregating the task utilization values of the tasks and the corresponding task replicas across the plurality of server machine clusters to determine an aggregated task utilization value associated with each task and the corresponding task replicas;
        identifying the aggregated task utilization values associated with each of the tasks and the corresponding task replicas associated with the respective server machine cluster; and
        assigning the cluster utilization value of the respective server machine cluster as a highest one of the aggregated task utilization values associated with the respective server machine cluster; and
    a re-allocation processing device configured to re-direct queries away from a server machine cluster based on the determined cluster utilization value of the server machine cluster by:
        determining a current number of queries per second directed toward the respective server machine cluster, each query directed toward the respective server machine cluster associated with a set of tasks and corresponding task replicas associated with the respective server machine cluster; and
        comparing the determined cluster utilization value of the respective server machine cluster to a target utilization value level; and one of:
            when the determined cluster utilization value exceeds the target utilization value level, reducing the current number of queries per second directed to the respective server machine cluster to a reduced number of queries per second sufficient to cause the cluster utilization value of the respective server machine cluster to decrease to a value approximately equal to the target utilization value level; or
            when the determined cluster utilization value of the respective server machine cluster is less than the target utilization value level, increasing the current number of queries per second directed to the respective server machine cluster to an increased number of queries per second sufficient to cause the cluster utilization value of the respective server machine cluster to increase to a value approximately equal to the target utilization value level.

2. The load balancing system according to claim 1, wherein a feedback loop between the utilization processing device and the utilization-based balancing processing device holds the cluster utilization value at the target utilization value level.

3. The load balancing system according to claim 2, wherein the target utilization value level of the cluster utilization value is substantially one hundred percent.

4. The load balancing system according to claim 1, wherein the utilization processing device measures demand on the corresponding resource as a function of queries per second.

5. The load balancing system according to claim 1, wherein the utilization processing device measures demand on the corresponding resource as a function of a central processing unit clock speed.

6. The load balancing system according to claim 1, wherein the utilization processing device measures demand on the corresponding resource as a function of memory usage.

7. The load balancing system according to claim 1, wherein the threshold demand of a server machine cluster as the corresponding resource is substantially one hundred percent utilization of any task in the respective server machine cluster.

8. The load balancing system according to claim 1, wherein the task utilization values are ratios that measure a relative utilization of a task or of a server machine cluster as the corresponding resource, and allow comparison between the task utilization values of different resources of the server machine clusters.

9. The load balancing system according to claim 1, wherein the utilization processing device reports a default high task utilization value if a server machine cluster is generating errors.

10. The load balancing system according to claim 1, wherein the re-allocation processing device is configured to re-direct queries away from the server machine cluster without knowledge of a method used to determine the cluster utilization value of each server machine cluster.

11. A method of utilization-based balancing of queries to an information retrieval system of server machine clusters, the method comprising;
   dividing computational resources available to a server machine cluster among tasks within that server machine cluster;
   replicating each task across that server machine cluster, a number of task replicas for each corresponding task being based on an anticipated demand for the corresponding task;
   within that server machine cluster, calculating a task utilization value for each task of a set of the tasks and for the one or more task replicas corresponding to each task, the task utilization value being a function of a current demand made by a respective task or one of the task replicas of the respective task on a system resource versus a threshold demand acceptable for the system resource;
   aggregating the task utilization values for each task and the corresponding replicas of each task across the server machine clusters to determine an aggregated task utilization value associated with each task and the corresponding task replicas;
   identifying the aggregated task utilization values associated with each of the tasks and the corresponding task replicas associated with the respective server machine cluster assigning a cluster utilization value of the respective server machine cluster as a highest one of the aggregated task utilization values associated with the respective server machine cluster; and
   re-directing system queries away from a server machine cluster based on the assigned cluster utilization value of the respective server machine cluster by:
      determining a current number of queries per second directed toward the respective server machine cluster, each query directed toward the respective server machine cluster associated with a set of tasks and corresponding task replicas associated with the respective server machine cluster; and
      comparing the determined cluster utilization value of the respective server machine cluster to a target utilization value level; and one of:
         when the determined cluster utilization value exceeds the target utilization value level, reducing the current number of queries per second directed to the respective server machine cluster to a reduced number of queries per second sufficient to cause the cluster utilization value of the respective server machine cluster to decrease to a value approximately equal to the target utilization value level; or
         when the determined cluster utilization value of the respective server machine cluster is less than the target utilization value level, increasing the current number of queries per second directed to the respective server machine cluster to an increased number of queries per second sufficient to cause the cluster utilization value of the respective server machine cluster to increase to a value approximately equal to the target utilization value level.

12. The method according to claim 11, further comprising using feedback between a utilization processing device and a utilization-based balancing processing device to hold the cluster utilization value at the target utilization value level.

13. The method according to claim 12, further comprising holding the target utilization value level of the cluster utilization value at substantially 100%.

14. The method according to claim 11, further comprising determining the task utilization value as a function of a current central processing unit speed and a threshold central processing unit speed.

15. The method according to claim 11, further comprising determining the task utilization value as a function of current memory usage and a threshold memory usage.

16. The method according to claim 11, further comprising determining the task utilization value as a function of the current number of queries per second and a threshold number of queries per second.

17. The method according to claim 11, further comprising re-directing the queries away from the server machine cluster in response to the cluster utilization value of the respective server machine cluster increasing above a value of substantially one hundred percent utilization of any task within the respective server machine cluster.

18. The method according to claim 11, further comprising calculating a task utilization value as a ratio, and allowing comparisons between task utilization values calculated for different system resources.

19. The method according to claim 11, further comprising reporting a default high cluster utilization value if a server machine cluster is generating errors.

20. The method according to claim 11, wherein re-directing system queries away from the server machine cluster includes re-directing system queries to another server machine cluster without knowledge of a method used to determine the cluster utilization value of each server machine cluster.

* * * * *